3,133,069
N-PHENYLPIPERAZINYL DERIVATIVES OF
BENZIMIDAZOLE
Anthony Stanley Fenton Ash, Epping, Andrew Malcolm Creighton, Mill Hill, London, and William Robert Wragg, Woodford Green, England, assignors to May & Baker Limited, Dagenham, England, a British company
No Drawing. Filed May 15, 1961, Ser. No. 109,850
Claims priority, application Great Britain May 18, 1960
5 Claims. (Cl. 260—268)

This invention relates to new N-phenylpiperazine compounds of therapeutic value, to processes for their preparation and pharmaceutical compositions containing them.

According to the present invention, there are provided new therapeutically useful N-phenylpiperazine derivatives of the general formula:

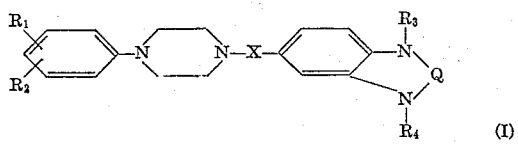

[wherein X represents a straight, saturated or ethylenically unsaturated hydrocarbon chain of two, three or four carbon atoms, which may be substituted by an alkyl or a hydroxy group, and in which, when the chain contains four carbon atoms, the carbon atom adjacent to the phenyl group may be substituted by an oxo group, $R_1$ represents a hydrogen atom or an o-halogen or p-fluorine atom, or an o-, m- or p-alkyl group, or an alkoxy, alkylthio, haloalkyl, cyano or sulphamoyl (including mono- and di-alkylsulphamoyl) group in the ortho position, $R_2$ represents a hydrogen atom or an o- or p-fluorine or o-chlorine atom, or an o-, m- or p-alkyl group, Q represents a straight, hydrocarbon group containing up to three carbon atoms which may be ethylenically unsaturated (when the benz-heterocycle may be a benzimidazole, a quinoxaline or a benz-1,5-diazepine) or saturated (when the benz-heterocycle is a benzimidazoline, a 1,2,3,4-tetrahydroquinoxaline or a 2,3,4,5-tetrahydrobenz-1,5-diazepine) and optionally substituted by an alkyl, hydroxy, hydroxyalkyl, alkoxyalkyl, aminoalkyl (including mono- and di-alkylaminoalkyl), phenyl, aralkyl, amino, acylamido, alkoxy, alkylthio or trifluoromethyl group or a halogen (preferably fluorine or chlorine) atom, or by two groups on the same carbon atom selected from alkyl, hydroxyalkyl and alkoxyalkyl groups, or by two groups each on a different carbon atom selected from alkyl, hydroxyalkyl, alkoxyalkyl, amino, acylamido, alkoxy and alkylthio groups and halogen (preferably fluorine or chlorine) atoms, and/or by one or two oxo or thiono groups, one of $R_3$ and $R_4$ represents a hydrogen atom, or an acyl, alkyl or hydroxyalkyl group and the other represents a hydrogen atom or an acyl, alkyl, aralkyl, hydroxyalkyl or aminoalkyl (including mono- and di-alkylaminoalkyl) group or—when Q represents an unsaturated group—one or both of $R_3$ and $R_4$ may represent single bonds] and their acid addition salts. It will be appreciated that, when one of $R_3$ and $R_4$ is a single bond, the grouping

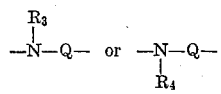

respectively when Q is an unsubstituted group will represent the group —N=CH—, —N=CH—CH$_2$—, —N=CH—CH$_2$—CH$_2$—, or —N=CH—CH=CH— in which event $R_4$ or $R_3$ respectively represents a hydrogen atom or a substituent as hereinbefore specified. When $R_3$ and $R_4$ are both single bonds the grouping —N($R_3$)—Q—N($R_4$)— when Q is an unsubstituted group will represent the group —N=CH—CH=N—, or —N=CH—CH$_2$—CH=N—. In such groups one or two of the hydrogen atoms may be replaced by optional substituents as mentioned above in respect of symbol Q.

It is to be understood that in this specification and the appended claims all alkyl, alkoxy and acyl groups referred to contain not more than four carbon atoms except in the case of products in which Q is substituted by an alkyl or hydroxyalkyl group in which event the group may contain up to six carbon atoms.

The aforesaid N-phenylpiperazine compounds possess pharmacological and psychotropic properties, of utility in the treatment of psychiatric disorders having, in particular, a beneficial effect on abnormal psychomotor activity.

Preferred compounds are those represented by general Formula I wherein X represents the grouping —CH$_2$CH$_2$—, —CH$_2$CH$_2$CH$_2$CO—, —(CH$_2$)$_4$—
—CH$_2$CH=CHCH$_2$— or —CH$_2$CH$_2$CH=CH—

$R_1$ represents a hydrogen atom or an o- or p-fluorine or o-chlorine atom, or an o-, m- or p-methyl group, or a methoxy, methylthio, trifluoromethyl or cyano group in the ortho-position, $R_2$ represents a hydrogen atom or an o- or p-fluorine or o-chlorine atom or an o-, m- or p-methyl group, Q represents a straight, saturated or ethylenically unsaturated hydrocarbon group containing up to three carbon atoms optionally substituted by a radical selected from alkyl, hydroxyalkyl, alkoxyalkyl, amino, acetamido, alkoxy, alkylthio or trifluoromethyl groups and a further radical on the same or on a different carbon atom selected from alkyl and hydroxyalkyl groups, and—when Q represents a saturated group—by one or two oxo or thiono groups, and $R_3$ and $R_4$ are the same or different and represent hydrogen atoms or acyl, alkyl or hydroxyalkyl groups, or—when Q represents an unsaturated group—one or both of $R_3$ and $R_4$ represents or represent single bonds. Of outstanding importance are those compounds wherein X represents the grouping —CH$_2$CH$_2$—, —CH$_2$CH$_2$CH$_2$CO— or —(CH$_2$)$_4$—, $R_1$ represents an o- or p-fluorine or o-chlorine atom or an o-methoxy or o-cyano group, $R_2$ represents a hydrogen atom or, when $R_1$ represents a p-fluorine atom, an o-fluorine or o-chlorine atom, Q represents the grouping —CR$_5$— (wherein $R_5$ represents a hydrogen atom or a methyl or ethyl group) and one of $R_3$ and $R_4$ represents a single bond and the other a hydrogen atom or a methyl or ethyl group, or Q represents the grouping —CO—CH(R$_5$)—CO— and $R_3$ and $R_4$ are the same or different and represent hydrogen atoms or methyl or ethyl groups. Of especial interest are 2-methyl-5-2'-(4-o-chlorophenylpiperazin-1-yl) ethylbenzimidazole,
2-ethyl-5-2'-(4-o-chlorophenylpiperazin-1-yl) ethylbenzimidazole,
1-ethyl-2-methyl-5-2'-(4-o-chlorophenylpiperazin-1-yl) ethylbenzimidazole,
2,4-dioxo-2,3,4,5-tetrahydro-7-2'-(4-o-chlorophenylpiperazin-1-yl)ethyl-1,5-benzodiazepine,
3-methyl-2,4-dioxo-2,3,4,5-tetrahydro-7-2'-(4-o-chlorophenylpiperazin-1-yl)ethyl-1,5-benzodiazepine and
3-ethyl-2,4-dioxo-2,3,4,5-tetrahydro-7-2'-(4-o-chlorophenylpiperazin-1-yl)ethyl-1,5-benzodiazepine and their acid addition salts; these compounds reduce abnormally high psychomotor activity and, in fact, have a sedating effect.

According to a feature of the present invention, the N-phenylpiperazine derivatives of general Formula I are prepared by the process which can be described generically as comprising the cyclisation of a compound of the general formula:

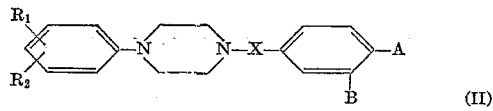

wherein X, $R_1$ and $R_2$ are as hereinbefore defined, and A and B are groups known to be capable of reacting together or jointly with a compound W to form the heterocyclic ring of the formula:

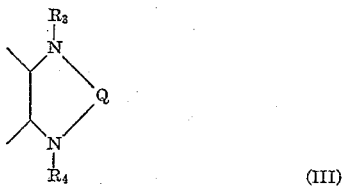

wherein Q, $R_3$ and $R_4$ are as hereinbefore defined, and if desired converting an N-phenylpiperazine base thus obtained into an acid addition salt.

According to a feature of the invention, compounds of Formula I where Q is a

group (wherein R represents a hydrogen atom or an alkyl group containing up to six carbon atoms) and one of $R_3$ and $R_4$ is a single bond and the other is a hydrogen atom or an alkyl, aralkyl, hydroxyalkyl or aminoalkyl group, i.e., a benzimidazole compound, are prepared by reduction of a compound of the general formula:

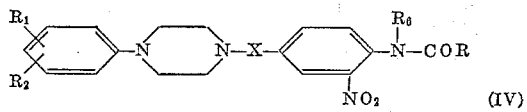

wherein $R_6$ represents a hydrogen atom or an alkyl, aralkyl, hydroxyalkyl or aminoalkyl group, and the other symbols are as hereinbefore defined. The reduction may be carried out, for example, with tin or stannous chloride and hydrochloric acid, or by catalytic hydrogenation over platinum oxide in acetic acid, or electrolytically in acetic acid solution.

According to a further feature of the invention, compounds of Formula I where Q is a

group (wherein $R_7$ represents a hydrogen atom, or an alkyl, hydroxyalkyl, alkoxyalkyl, aminoalkyl, phenyl, aralkyl, amino, acylamido, alkoxy, alkylthio, or trifluoromethyl group) and one of $R_3$ and $R_4$ is a single bond and the other is a hydrogen atom or an alkyl, aralkyl, hydroxyalkyl or dialkylaminoalkyl group, i.e., a benzimidazole compound, are prepared by reacting a compound of the general formula:

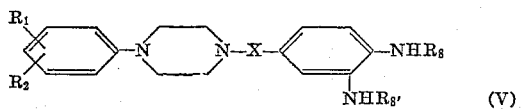

(wherein one of the symbols $R_8$ and $R_{8'}$ represents a hydrogen atom or an alkyl, aralkyl, hydroxyalkyl or dialkylaminoalkyl group and the other represents a hydrogen atom, and X, $R_1$ and $R_2$ are as hereinbefore defined) with an acid of the formula HOOC—$R_7$ (wherein $R_7$ is as hereinbefore defined) or a derivative thereof, such as a halide, anhydride, ester (including ortho or imino esters), amide, lactone, nitrile, aldehyde or ketone, or with guanidine. The reaction may be carried out in the presence or absence of a mineral acid such as hydrochloric acid or in the presence or absence of a solvent such as aqueous hydrochloric acid, e.g., 6 N hydrochloric acid, or an excess of the carboxylic acid of formula HOOC—$R_7$ or its derivative, for example, excess formic acid may be used as solvent. The reaction is preferably effected at an elevated temperature such as the boiling point of the solvent.

According to a still further feature of the invention, those compounds of general Formula I where Q is the group

and one of $R_3$ and $R_4$ is a hydrogen atom or an alkyl, aralkyl, hydroxyalkyl or dialkylaminoalkyl group and the other is a hydrogen atom are prepared by heating a compound of Formula V with an alkali metal alkyl xanthate, carbon disulphide or thiourea in a suitable solvent, such as an alcohol, or thiophosgene in an inert solvent such as toluene.

According to another feature of the invention, compounds of Formula I where Q is a —CO—, —CO—CO— or —CO—CR$_7$R$_{7'}$—CO— group ($R_7$ being as hereinbefore defined and $R_{7'}$ being a hydrogen atom or an alkyl, hydroxyalkyl or alkoxyalkyl group), $R_3$ is a hydrogen atom or an alkyl, aralkyl, hydroxyalkyl or dialkylaminoalkyl group and $R_4$ is a hydrogen atom are prepared by reaction of a compound of Formula V with a reactive derivative of carbonic, oxalic or malonic acid such as the acid chloride, amide or ester, or with oxalic or malonic acid or a C-substituted derivative thereof when the desired Q grouping is —CO—CO— or

—CO—CR$_7$R$_{7'}$—CO—

The reaction may be effected by heating the reactants in an inert solvent such as toluene (for acid chlorides) or alcohols such as amyl alcohol or dimethylformamide (for acids, amides and esters) preferably at the boiling point of the solvent. According to another feature of the invention, compounds of Formula I where Q is a

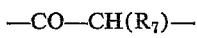
—CO—CH($R_7$)— group, $R_3$ is a hydrogen atom or an alkyl, aralkyl, hydroxyalkyl or dialkylaminoalkyl group and $R_4$ is a hydrogen atom are prepared by reaction of a compound of Formula V with a haloacetyl halide of the formula Hal—CO—CH($R_7$)—Hal, Hal representing a halogen atom and $R_7$ being as hereinbefore defined. The reaction may be effected in an inert solvent such as benzene or chloroform with heating if necessary.

According to a further feature of the invention, compounds of Formula I where Q is a —C($R_9$)—C($R_{9'}$)— group (wherein $R_9$ represents a hydrogen atom or an alkyl, hydroxyalkyl, alkoxyalkyl, dialkylaminoalkyl, phenyl, aralkyl or trifluoromethyl group and $R_{9'}$ represents a hydrogen atom or an alkyl, hydroxyalkyl, or alkoxyalkyl group) and $R_3$ and $R_4$ represent single bonds are prepared by reaction of a compound of Formula V wherein $R_8$ and $R_{8'}$ are hydrogen atoms with an α,α'-dicarbonyl compound of the formula OC($R_9$)—($R_{9'}$)CO wherein $R_9$ and $R_{9'}$ are as hereinbefore defined), such as glyoxal or diacetyl. The reaction may be carried out in an inert solvent such as alcohol, e.g., ethanol, or benzene or toluene at the boiling point of the solvent.

According to another feature of the invention, compounds of general Formula I where Q is a —CH$_2$—, —CH$_2$CH$_2$— or —CH$_2$CH$_2$CH$_2$— group or such a group substituted by an alkyl, hydroxyalkyl, alkoxyalkyl, dialkylaminoalkyl, phenyl or aralkyl group and optionally by a further alkyl, hydroxyakyl or alkoxyalkyl group and $R_3$ and $R_4$ represent hydrogen atoms, are prepared by reaction of a compound of Formula V wherein $R_8$ and $R_{8'}$ are hydrogen atoms with a diester of the formula:

$$Y—(CH_2)_n—Y \quad \quad (VI)$$

(wherein Y represents a reactive ester residue such as a halogen atom or a sulphuric or sulphonic ester residue, and n represents 1, 2 or 3) or such a diester substituted as aforesaid for the group Q on one or two carbon atoms.

The reaction may be carried out at an elevated temperature in the presence or absence of an inert solvent such as a ketone, an alcohol or a benzene hydrocarbon. The same compounds may also be prepared, according to a further feature of the invention, by reacting a diester of Formula VI with a compound of the general formula:

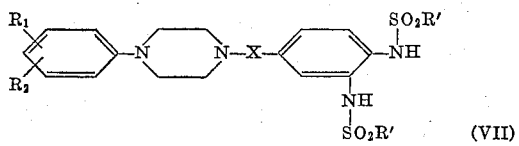

(wherein R' represents a hydrocarbon radical, and the other symbols are as hereinbefore defined) in the presence of an acid-binding agent, and removing the N-substituent —$SO_2R'$ groups in the resulting product by hydrolysis.

According to a still further feature of the invention, those compounds of Formula I where Q is a

group (where R is as hereinbefore defined) and one of $R_3$ and $R_4$ is a hydrogen atom or an acyl, alkyl, aralkyl, hydroxyalkyl or dialkylaminoalkyl group and the other is a single bond, are prepared by heating a compound of the formula:

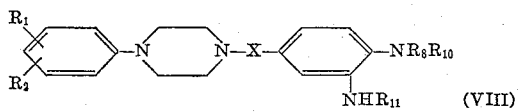

(wherein one of the symbols $R_{10}$ and $R_{11}$ represents a hydrogen atom or an acyl group and the other represents an acyl group, and $R_8$ represents a hydrogen atom or an alkyl, aralkyl, hydroxyalkyl or dialkylaminoalkyl group) alone or in the presence of a mineral acid, such as hydrochloric acid, or caustic alkali.

According to a further feature of the invention, the compounds of Formula I where Q is a —CO— group and one of $R_3$ and $R_4$ is a single bond and the other a hydrogen atom, or Q is a grouping —$CH_2CO$—, —$CH_2CH_2CO$— and $R_3$ and $R_4$ are both hydrogen atoms, are prepared by heating a compound of the general formula:

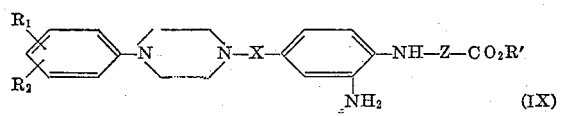

(wherein Z represents a single bond or a —$CH_2$— or —$CH_2CH_2$— group, R' repreesnts a hydrocarbon group, and the other symbols are as hereinbefore defined) preferably in a solvent medium. Where Z is a single bond —$CH_2$— or —$CH_2CH_2$— the product obtained is one in which Q is —CO—, —$CH_2CO$— or —$CH_2CH_2CO$— respectively.

According to a modification of the aforementioned generic process the N-phenylpiperazine derivatives of general Formula I are prepared by reaction of phenylpiperazine of the formula:

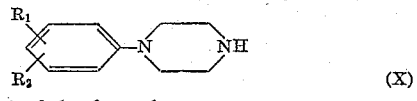

with a compound of the formula:

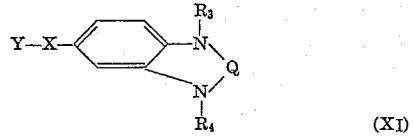

wherein the various symbols are as hereinbefore defined. The reaction is preferably effected by heating the reactants in an inert solvent such as a ketone (e.g., acetone), an alcohol (e.g., n-butanol), a benzene hydrocarbon or a halogenated hydrocarbon in the presence of an acid-binding agent, e.g., a tertiary base such as triethylamine. The acid-binding agent is conveniently an excess of the piperazine of Formula X.

According to another feature of the invention, the n-phenylpiperazine derivatives of general Formula I are prepared by reaction of a compound of the formula:

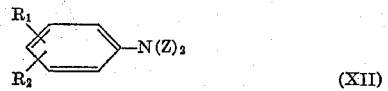

with a heterocyclic compound of the formula:

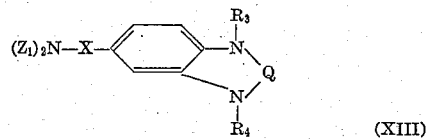

wherein one of the symbols Z and $Z_1$ represents a hydrogen atom and the other represents the grouping —$CH_2$—$CH_2$—Y, and the other symbols including Y are as hereinbefore defined. The reaction is preferably effected by heating the reactants in an inert solvent (for example, those mentioned in respect to the last-preceding process) in the presence of an acid-binding agent. Preferably the reactants are those in which Z in Formula XII is a grouping —$CH_2$—$CH_2$—Y and $Z_1$ in Formula XIII is a hydrogen atom.

Compounds of Formula I where X is a straight saturated or ethylenically unsaturated hydrocarbon chain of two, three or four carbon atoms, optionally substituted by an alkyl or a hydroxy group are, according to a still further feature of the invention, prepared by reducing a compound of the general formula:

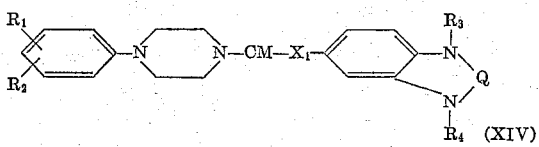

(wherein M represents an oxygen or sulphur atom, $X_1$ is a straight, saturated or ethylenically unsaturated hydrocarbon chain containing one to three carbon atoms optionally substituted by an alkyl or hydroxy group, and the other symbols are as hereinbefore defined) by known methods for reducing a carbonyl or thiocarbonyl group to a methylene group. When M represents oxygen, reduction of the carbonyl group is preferably effected by treatment with lithium aluminum hydride; when M represents sulphur, reduction of the thiocarbonyl group is preferably effected with Raney nickel.

It will be appreciated that when Q in the starting material of Formula XIV contains oxo or thiono groups, those groups will probably also be affected by the reduction conditions employed, but the products will still be within the scope of general Formula I since the oxo or thiono groups will be reduced to —$CH_2$—.

Compounds of general Formula I in which X is —$CH_2$—CH=CH—$CH_2$— or $(CH_2)_4$— are, according to a feature of the invention, prepared by reacting a compound of the formula:

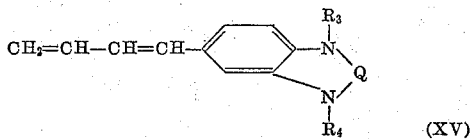

(wherein Q, $R_3$ and $R_4$ are as hereinbefore defined) with a phenylpiperazine of Formula X and, if desired, reducing the double bond in the product, e.g., by catalytic hydrogenation using Raney nickel as catalyst, to obtain a compound of general Formula I in which X is tetramethylene. The reaction may be effected by heating the reactants in an inert solvent such as an alcohol, e.g., n-butanol.

According to another feature of the invention, the compounds of Formula I where X contains a —CH₂— grouping adjacent to the nitrogen atom of the piperazine nucleus are prepared by reducing a nitrile of the general formula:

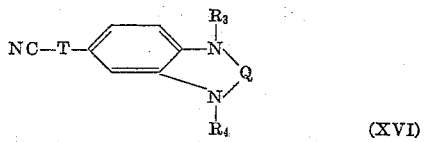

(XVI)

(wherein T represents —CH₂—, —(CH₂)₂—, —(CH₂)₃— or —(CH₂)₂—CO— or such a grouping substituted by an alkyl or hydroxy group, and Q, R₃ and R₄ are as hereinbefore defined), preferably by catalytic hydrogeneration using a catalyst such as Raney nickel, in the presence of an N-phenylpiperazine of Formula X. The same compounds may also, in accordance with a further feature of the invention, be prepared by reducing an aldehyde of the general formula:

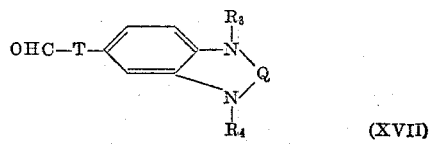

(XVII)

(wherein the various symbols are as hereinbefore defined), which may be effected with molecular hydrogen in the presence of a hydrogenation catalyst, in the presence of an N-phenylpiperazine of general Formula X.

It is within the scope of the present invention to prepare a compound of general Formula I by first preparing another of said compounds which has a substituent or substituents different from that or those desired and thereafter converting the said substituent or substituents to the desired substituent or substituents. For example, those compounds in which the grouping

—N(R₃)—Q—N(R₄)— represents —N=CH—NH— or —N=CH—CH=N may be converted to corresponding compounds in which the aforesaid grouping is —NH—CH₂—NH or

—HN—CH₂—CH₂—NH— by reduction with lithium aluminum hydride in a suitable solvent such as ether or tetrahydrofuran. Moreover, those compounds where the grouping Q is substituted by one or two oxo groups may be converted to corresponding thiono substituted compounds by treatment with phosphorus pentasulphide. In the case of compounds where X is the grouping —(CH₂)₃—CO—, products may be obtained wherein X is —(CH₂)₄— or

—(CH₂)₃—CHOH— by reducing the carbonyl group to —CH₂— or

—CHOH— respectively by known methods. Where X is a saturated chain substituted by a hydroxy group, such compounds can be converted to compounds in which the chain is ethylenically unsaturated by dehydration.

The starting materials of general Formula II may be prepared by reacting a compound of the general formula:

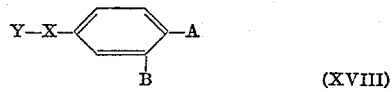

(XVIII)

(wherein the various symbols are as hereinbefore defined) with a piperazine derivative of Formula X, in an inert solvent, e.g., an alcohol, ketone, a benzene hydrocarbon or a halogenated hydrocarbon, in the presence of an acid-binding agent, and if necessary converting the groups A and B in the resulting product, for example nitro or acyl-amido, into the desired groupings by known methods. The term "known methods" means methods heretofore used or described in the chemical literature.

When the compounds of general Formula I are used for therapeutic purposes in the form of salts, it should be understood that only those such salts should in practice be employed as contain anions that are relatively innocuous to the animal organism when used in therapeutic doses, so that the beneficial physiological properties inherent in the parent compound are not vitiated by side-effects ascribable to those anions; in other words, only non-toxic salts are contemplated. Suitable acid addition salts include hydrohalides (for example hydrochlorides), phosphates, nitrates, sulphates, maleates, fumarates, citrates, tartrates, isethionates, methane sulphonates, and ethane disulphonates. These salts may be made from the bases of general Formula I by methods heretofore used in the art for making acid addition salts. For example, the acid addition salts may be made by mixing the required base with an equivalent quantity of a non-toxic acid in a solvent and isolating the resultant salt by filtration after, if necessary, evaporation of part or all of the solvent. They may be purified by crystallisation or by any other method commonly used in the art.

The following examples illustrate the invention.

*Example I*

1-2'-(4-acetamido-3-nitrophenyl)ethyl bromide (41.1 g.) (prepared by nitration of 2-p-acetamidophenylethyl bromide with fuming nitric acid), phenylpiperazine (48.9 g.) and dry toluene (500 ml.) were heated together under reflux for eighteen hours. The cooled reaction mixture was filtered from phenylpiperazine hydrobromide (32.3 g., 93%) and the filtrate evaporated to give a yellow crystalline residue. This was recrystallised from iso-propanol/cyclohexane to give, on cooling to 0° C., 1-2'-(4 - acetamido - 3 - nitrophenyl)ethyl - 4 - phenylpiperazine (43.2 g., 82%), M.P. 117–119° C.

1 - 2' - (4 - acetamido - 3 - nitrophenyl)ethyl - 4 -phenylpiperazine (15 g.) was added to a solution of potassium hydroxide (10 g.) in water (100 ml.) and ethanol (100 ml.) and the mixture boiled under reflux for thirty minutes. Dilution of the reaction mixture with an excess of water gave a solid product which, on recrystallisation from acetone/isopropanol, afforded 1-2'-(4-amino-3-nitrophenyl)ethyl-4-phenylpiperazine (10.9 g., 82%), M.P. 136–138° C.

1-2'-(4-amino-3-nitrophenyl)ethyl-4 - phenylpiperazine (12 g.) was hydrogenated in methanolic solution over a Raney nickel catalyst at 100 p.s.i. and 24° C. The catalyst was removed and the filtrate evaporated to dryness to give a pale pink crystalline residue of the o-phenylene diamine. This was dissolved in a mixture of glacial acetic acid (150 ml.) and sulphuric acid (25 ml.) and the solution boiled under reflux for ninety minutes. Evaporation under reduced pressure gave a residue which was dissolved in water (150 ml.) to give a solution which was made alkaline with ammonia. Extraction of the resultant precipitate with chloroform followed by evaporation of the dried (MgSO₄) extracts gave a solid residue, which on recrystallisation from ethyl methyl ketone gave 2 - methyl - 5-2'-(4-phenylpiperazin-1-yl)ethylbenzimidazole (7.7 g., 65%), M.P. 178–180° C.

Similarly prepared, but replacing the acetic acid with propionic acid and using the corresponding o-chlorophenypiperazine, was 2-ethyl-5-2'-(4-o-chlorophenylpiperazin-1-yl)ethylbenzimidazole dihydrate (73% yield), M.P. 153–154° C. (slight shrinkage at ca. 105° C.) from aqueous methanol.

Similarly prepared, but using the corresponding o-methoxyphenylpiperazine, was 2-methyl-5-2'-(4-o-methoxyphenylpiperazin-1-yl)ethylbenzimidazole dihydrochloride as a colourless microcrystalline solid, M.P. 271–274° C.

*Example II*

A solution of 1,2'-(4-acetamido-3-nitrophenyl)ethyl- 4-o-chlorophenylpiperazine (169 g.) [prepared by reaction of 2-(4-acetamido-3-nitrophenyl)ethyl bromide with N-o-chlorophenylpiperazine in dry benzene in the presence of triethylamine] in methanol (2.25 litres) was hydrogenated over a Raney nickel catalyst (10%) at 70 p.s.i. and 35° C. The catalyst was removed and the filtrate was evaporated to dryness. The residue of crude 1-2'-(4-acetamido-3-aminophenyl)ethyl-4-o - chlorophenylpiperazine was dissolved in a mixture of glacial acetic acid (1.5 litres) and sulphuric acid (240 ml.) and the solution heated under reflux for 2½ hours. The clear solution was then allowed to cool overnight to ca. 10° C. The solid product was filtered off, washed with a little isopropanol and ether and then suspended in warm water (2 litres). An excess of ammonium hydroxide (d. 0.880) was added and the precipitated base then filtered off, washed with water and dissolved in dilute hydrochloric acid (2.5 litres, 0.8 N). The hot solution was treated with charcoal and filtered, and the filtrate made alkaline with ammonia. Extraction of the resultant precipitate with chloroform, followed by evaporation of the dried (MgSO₄) extracts, gave an oily residue which on recrystallisation from aqueous methanol afforded 2-methyl-5-2'-(4 - o-chlorophenylpiperazin-1-yl)ethylbenzimidazole dihydrate as pale cream rectangular plates (104 g., 67%), M.P. 104–109° C., resolidifies at ca. 125° then melts at 162–164° C.

Similarly prepared were 2-methyl-5-2'-(4-o-fluorophenylpiperazin-1-yl)ethylbenzimidazole monohydrate (42% yield), M.P. 115–118° C. from aqueous methanol, 2-methyl-5-2'-[4-(2-chloro-4-fluorophenyl)piperazin-1 - yl] ethylbenzimidazole (71% yield), M.P. 194–195° C. from aqueous methanol, 2-methyl-5-4'-(4-o-chlorophenylpiperazine-1-yl)-4'-oxobutylbenzimidazole (46% yield), M.P. 98–102° C. from aqueous methanol, and 2-methyl-5 - 2' - (4-m-methylphenylpiperazin-1-yl)ethylbenzimidazole monohydrate (85% yield), M.P. 120–125° C. from aqueous methanol.

Example III 1-2'-(3,4-diaminophenyl)ethyl - 4 - o-chlorophenylpiperazine (10 g.) (prepared by deacetylation of 1-2'-(4-acetamido-3-nitrophenyl)ethyl-4 - o - chlorophenylpiperazine with potassium hydroxide, and catalytic hydrogenation of the resulting product in methanol over Raney nickel at 460 p.s.i.) and formic acid (100 ml., 98%) were boiled together under reflux for 2 hours. The excess of formic acid was removed by evaporation under reduced pressure and the residue dissolved in water to give a solution which was made alkaline with ammonia. The precipitate was filtered off, washed with water and then recrystallised twice from aqueous isopropanol to give 5-2'-(4 - o-chlorophenylpiperazine-1-yl)ethylbenzimidazole as colourless plates (7.8 g., 76%), M. P. 195–197° C.

Similarly prepared from 1-2'-(3-amino-4-N-ethylaminophenyl)ethyl-4-o-chlorophenylpiperazine [prepared by reduction of the acetamido group of 1-2'-(4-acetamido-3-aminophenyl)ethyl-4-o-chlorophenylpiperazine in tetrahydrofuran with lithium aluminum hydride] and formic acid was 1 - ethyl - 5-2'-(4-o-chlorophenylpiperazin-1-yl)ethyl-benzimidazole dihydrochloride (41% yield), M.P. 257–262° C. from isopropanol/ethylmethyl ketone.

Example IV

1 - 2'-(3,4-diaminophenyl)ethyl-4-o-chlorophenylpiperazine (10 g.) diacetyl (3.2 ml.) and dry benzene (250 ml.) were boiled together under reflux for 2 hours while the water evolved (1.3 ml.) was collected in a Dean and Stark trap. Evaporation of this solution to dryness gave a solid residue which, on recrystallisation twice from isopropanol, gave 2,3-dimethyl-6-2'-(4-o-chlorophenylpiperazin-1-yl)ethylquinoxaline as pale yellow needles (9.4 g., 75%), M.P. 133–134° C.

Example V

1 - 2' - (3,4-diaminophenyl)ethyl-4-o-chlorophenylpiperazine (15 g.) dimethyl oxalate (5.4 g.) and amyl alcohol (500 ml.) were heated together under reflux for 30 hours. The residue obtained on evaporation of the reaction mixture was recrystallised first from n-butanol and then from aqueous dimethylformamide to give 6-2'-(4-o-chlorophenylpiperazin-1-yl)-ethyl - 2,3 - dioxo - 1,2,3,4-tetrahydroquinoxaline as a pale cream microcrystalline solid (8.4 g., 48%), M.P. 346–348° C.

Example VI 1-2'-(3,4 - diaminophenyl)ethyl-4-o-chlorophenylpiperazine (7 g.), diethyl malonate (4.2 g.) and dimethylformamide (200 ml.) were heated under reflux for 21 hours. The solution was concentrated to ca. 70 ml. and then cooled to 0° C., diluted with ice-cold water (500 ml.) and filtered. The solid product, M.P. 261–264° C., was recrystallised from aqueous tetrahydrofuran to give 2,4 - dioxo - 2,3,4,5 - tetrahydro-7-2'-(4-o-chlorophenyl-piperazin-1-yl)ethyl-1,5-benzodiazepine as a pale yellow microcrystalline solid (5.4 g., 63%), M.P. 265–267° C. Further recrystallisation from n-butanol (ca. 250 ml.) raised the melting point to 277–278° C. The following salts have also been prepared: monomethanesulphonate dihydrate, M.P. 175–177° C. from water; monoisethionate, M.P. 234–235° C. from aqueous isopropanol, and monotartrate, M.P. 202° C. (dec.) from aqueous ethanol.

Similarly prepared were DL-3-methyl-2,4-dioxo-2,3,4,5-tetrahydro - 7,2' - (4-o-chlorophenylpiperazin-1-yl)ethyl-1,5-benzodiazepine (20 hours' reflux of the o-phenylene diamine with a solution of diethyl methylmalonate in dimethylformamide gave a 35% yield), M.P. 270–274° C. from aqueous dimethylformamide;

DL-3-ethyl - 2,4 - 2,3,4,5-tetrahydro-7,2'-(4-o-chlorophenylpiperazin-1-yl)ethyl-1,5-benzodiazepine (15 hours' reflux of the o-phenylene diamine with a solution of diethyl ethylmalonate in dimethylformamide gave a 21% yield), M.P. 254–256° C. from n-butanol;

3,3-diethyl-2,4-dioxo - 2,3,4,5 - tetrahydro-7-2'-(4-o-chlorophenylpiperazin-1-yl)ethyl - 1,5 - benzodiazepine (48 hours' reflux of the o-phenylene diamine with a solution of diethyl diethylmalonate in dimethylformamide gave a 5% yield), M.P. 258–262° C. from methanol;

DL-3-phenyl - 2,4 - dioxo - 2,3,4,5 - tetrahydro-7-2'-(4-o-chlorophenylpiperazin-1-yl)ethyl - 1,5 - benzodiazepine (48 hours' reflux of the o-phenylene diamine with a solution of diethyl phenylmalonate in dimethylformamide gave a 48% yield), M.P. 232–233° C. from isopropanol;

DL-3-acetamido-2,4-dioxo - 2,3,4,5 - tetrahydro-7-2'-(4-o-chlorophenylpiperazin-1-yl)ethyl - 1,5 - benzodiazepine (25 hours' reflux of the o-phenylene diamine with a solution of diethyl acetamidomalonate in dimethylformamide gave a 12% yield), M.P. 299–300° C. (sealed evacuated capillary) from n-propanol.

Example VII 1-2'-(3,4 - diaminophenyl)ethyl-4-o-chlorophenylpiperazine (15 g.), urea (7.5 g.) and amyl alcohol (400 ml.) were boiled together under reflux for 21 hours. The solution was filtered hot and the filtrate cooled at 0° C. and filtered to give 5-2'-(4-o-chlorophenylpiperazin-1-yl)ethyl-benzimidazole-2-one as colourless prisms (14.5 g., 90%), M.P. 262–264° C.

Example VIII 1-2'-(3,4 - diaminophenyl)ethyl-4-o-chlorophenylpiperazine (12 g.), trifluoroacetic acid (30 g.) and 6 N hydrochloric acid (135 ml.) were heated together under reflux for six hours. The cooled solution was poured onto ice/water (600 g.) containing an excess of ammonia and the precipitated solid collected and recrystallised twice from aqueous ethanol (1:1) to give 2-trifluoromethyl-5-2'-(4-o-chlorophenylpiperazin - 1 - yl)ethylbenzimidazole (7.8 g., 53%), M.P. 183–184° C.

Similarly prepared were 2 - hydroxymethyl-5-2'-(4-o- chlorophenylpiperazin - 1 - yl)ethylbenzimidazole (5½ hours' reflux of the o-phenylene diamine with glycollic acid in 6 N hydrochloric acid gave a 86% yield), M.P. 240–242° C. from ethanol;

2-isopropyl-5-2'-(4-o-chlorophenylpiperazin - 1 - yl)ethyl-benzimidazole (14 hours' reflux of the o-phenylene diamine with isobutyric acid in 6 N hydrochloric acid gave a 43% yield), M.P. 185–186° C. from isopropanol/diisopropyl ether;

1-ethyl - 2 - methyl-5-2'-(4-o-chlorophenylpiperazin-1-yl)-ethylbenzimidazole (15 hours' reflux of 1-2'-(3-amino-4 - N - ethylaminophenyl)ethyl-4-o-chlorophenylpiperazine with acetic acid in 6 N hydrochloric acid gave a 45% yield), M.P. 143–144° C. from isopropanol/diisopropyl ether;

2 - benzyl - 5 - 2'-(4-o-chlorophenylpiperazin-1-yl)ethyl-benzimidazole (6 hours' reflux of the o-phenylene diamine with phenylacetic acid in 4 N hydrochloric acid gave a 40% yield), M.P. 170–171° C. from aqueous methanol, and 2 - methoxymethyl-5-2'-(4-o-chlorophenylpiperazin-1-yl)-ethylbenzimidazole dihydrate (3 hours' reflux of the o-phenylene diamine with methoxy acetic acid in 4 N hydrochloric acid gave a 56% yield), M.P. 75–77° C. from aqueous methanol.

*Example IX*

1-2'-(3-acetamido - 4 - N - ethylacetamidophenyl)ethyl-4-o-chlorophenylpiperazine (4.4 g.) (prepared by acetylation of the corresponding 3-amino-4-N-ethylamino compound with acetic anhydride), acetic acid (20 ml.) and 6 N hydrochloric acid (100 ml.) were heated together under reflux for five hours. The cooled solution was poured onto ice/water (300 g.) containing an excess of ammonia and the resultant precipitate was extracted with chloroform. Evaporation of the chloroform extracts gave a solid residue which, on recrystallisation from isopropanol/di-isopropyl ether, afforded 1-ethyl-2-methyl-5-2'-(4-o-chlorophenylpiperazin - 1 - yl)ethylbenzimidazole (2.0 g., 54%), M.P. 141–143° C.

*Example X*

1-2'-(3,4 - diaminophenyl)ethyl-4-o-chlorophenylpiperazine (5 g.) was boiled together under reflux with an ethanolic solution of potassium ethyl xanthate (prepared by adding 1.0 ml. of carbon disulphide to a solution of 0.94 g. potassium hydroxide in 15 ml. of ethanol and 2 ml. of water) for 3 hours. The cooled solution was diluted with water (50 ml.), allowed to stand overnight and the solid precipitate collected and recrystallised from n-butanol to give 5-2'-(4-o-chlorophenylpiperazin-1-yl)-ethylbenzimidazole-2-thione as pale pink microneedles (3.9 g., 70%), M.P. 262–264° C.

*Example XI*

1-2'-(3,4 - diaminophenyl)ethyl-4-o-chlorophenylpiperazine (5 g.), ethylene cyanohydrin (1.3 g.) and 6 N hydrochloric acid (100 ml.) were boiled together under reflux for five hours. The cooled solution was poured onto ice/water (400 g.) and the precipitated purple oil extracted with ethyl acetate. The residue obtained by evaporation of the solvent was recrystallised twice from ethyl acetate/petroleum ether (B.P. 60–80° C.) to give 2-(2-hydroxyethyl) - 5 - 2' - (4-o-chlorophenylpiperazin-1-yl)-ethylbenzimidazole (1.0 g., 17%), M.P. 149–151° C. (dec.).

*Example XII*

1-2'-(4-acetamido - 3 - aminophenyl)ethyl-4-o-chlorophenylpiperazine (5 g.), acetic acid (20 ml.) and 6 N hydrochloric acid (100 ml.) were heated together under reflux for five hours. The solution was evaporated and the residue poured onto ice/water (300 g.) containing an excess of ammonia. The solid precipitate was collected and recrystallised from aqueous methanol to give 2-methyl-5-2'-(4-o-chlorophenylpiperazin - 1 - yl)ethylbenzimidazole dihydrate (4.8 g., 90%), M.P. 103–110° C., resolidifies at ca. 125° C. then melts at 163–164° C.

*Example XIII* o-Cyanobromobenzene (23.7 g.) and anhydrous piperazine (33.6 g.) were heated together in a bomb at 170° C. for 18 hours. The cooled melt was shaken with 2 N hydrochloric acid and chloroform and the aqueous acid solution made alkaline with sodium hydroxide. The basic product was extracted into chloroform, the chloroform extract washed with water and the dried (MgSO₄) chloroform solutions evaporated to dryness to give N-o-cyanophenylpiperazine (24.4 g., 100%) a viscous oil sufficiently pure for the next stage. A sample of N-o-cyanophenylpiperazine monohydrochloride melted at 205–207° C.

N-o-cyanophenylpiperazine was condensed with 1-2'-(4-acetamido-3-nitrophenyl)ethyl bromide, as described in Example I, to give 1-2'-(4-acetamido-3-nitrophenyl)-ethyl-4-o-cyanophenylpiperazine, M.P. 91–92° C. After catalytic hydrogenation (using platinium oxide catalyst in ethanol at room temperature and atmospheric pressure) to 1-2'-(4-acetamido - 3 - aminophenyl)ethyl-4-o-cyano-phenylpiperazine, M.P. 158–160° C., cyclisation as described in Example II gave 2-methyl-5-2'-(4-o-cyanophenylpiperazin-1-yl)ethylbenzimidazole monohydrate, M.P. 103–106° C.

*Example XIV*

4-3'-nitro-4'-benzylaminophenyl - 4 - oxobutyl chloride (20 g.) (prepared by reacting 4-3'-nitro-4'-fluorophenyl-4-oxobutyl chloride with benzylamine in diethyl ether at room temperature) and o-chlorophenylpiperazine (23.7 g.) were intimately mixed and heated at 145° C. for 1¼ hours. After cooling, the dark solid mass was extracted successively with water and ethyl acetate. The organic extract was separated and treated with a slight excess of concentrated hydrochloric acid. The precipitated solid was filtered off, washed with ethyl acetate, dissolved in boiling methanol and the solution treated with excess ammonia (d.=0.88). On cooling the orange yellow solid was collected on a filter and recrystallised (charcoal) from ethyl acetate-cyclohexane. The product, 1-4'-(3-nitro-4-benzylaminophenyl) - 4'- oxobutyl-4-o-chlorophenylpiperazine (20 g., 67.5%), melted at 126–7° C.

1-4'-(3-nitro - 4 - benzylaminophenyl)-4'-oxobutyl-4-o-chlorophenylpiperazine (18.6 g.) was hydrogenated in tetrahydrofuran (200 ml.) over Raney nickel (10%) at 100 p.s.i. and 25° C. After hydrogen uptake had ceased, the reaction mixture was filtered and concentrated in vacuo to a brown syrup. This syrup was dissolved in acetic acid (100 ml.) and acetic anhydride (80 ml.) containing a few drops of concentrated sulphuric acid and the solution heated at 95° C. for 1 hour. After concentration in vacuo to 100 ml., the residual solution was poured onto ice. The solid product was collected on a filter and dissolved in 4 N hydrochloric acid (110 ml.) and acetic acid (50 ml.). The solution was refluxed for 5 hours, concentrated in vacuo to 100 ml. and poured onto a mixture of crushed ice and excess ammonia. The resultant oil was extracted into ethyl acetate (3 x 100 ml.) and the combined organic extracts dried over sodium sulphate. Addition of a slight excess of ethereal hydrogen chloride to the filtered ethyl acetate solution gave a gummy solid which crystallised on trituration with acetone. This solid on recrystallisation from a mixture of methanol, acetone and ethyl acetate gave the product 1-benzyl-2-methyl-5-4'-(4-o-chlorophenylpiperazin - 1 - yl)-4'- oxobutylbenzimidazole dihydrochloride (16 g., 76%), M.P. 237–9° C.

The present invention includes within its scope pharmaceutical compositions which comprise one or more compounds of general Formula I or their acid addition salts as aforesaid together with a significant amount of a pharmaceutical carrier. The invention includes especially such compositions made up for oral or parenteral administration. In clinical practice the compounds of the present invention will normally be administered orally.

Solid compositions for oral administration include compressed tablets, pills, dispersible powders, and granules. In such solid compositions, one or more of the active compounds is or are admixed with at least one inert diluent such as calcium carbonate, potato starch, alginic acid, or lactose. The compositions may also comprise, as is normal practice, additional substances other than inert diluents, e.g., lubricating agents, such as magnesium stearate.

Liquid compositions for oral administration include pharmaceutically acceptable emulsions, solutions, suspensions, syrups, and elixirs containing inert diluents commonly used in the art, such as water and liquid paraffin. Besides inert diluents such compositions may also comprise adjuvants, such as wetting and suspending agents, and sweetening and flavouring agents.

The compositions according to the invention for oral administration also include capsules of absorbable material such as gelatin containing one or more of the active substances with or without the addition or diluents or excipients.

Preparations according to the invention for parenteral administration include sterile aqueous or non-aqueous solutions, suspensions or emulsions. Examples of non-aqueous solvents or suspending media are propylene glycol, polyethylene glycol, vegetable oils such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage shall be obtained. Obviously several unit dosage forms may be administered at about the same time. In general, the preparations of the present invention should normally contain at least 0.025% by weight of active substance in the case of injectable solutions and at least 0.1% by weight of such substance in the case of oral preparations.

The following examples illustrate pharmaceutical compositions according to the invention.

*Example XV*

Tablets of the formula:

| | Mg. |
|---|---|
| 2,4-dioxo-2,3,4,5-tetrahydro-7-2'-(4 - o - chlorophenylpiperazin-1-yl)ethyl-1,5-benzodiazepine | 10 |
| Lactose | 49.5 |
| Starch | 20 |
| Dextrin | 20 |
| Magnesium stearate | 0.5 | are prepared by intimately mixing the benzodiazepine derivative, lactose, starch and dextrin and passing the mixture through a 60-mesh British Standard sieve. After addition of the magnesium stearate, the mixture is granulated to a suitable size and the granules compressed to form tablets.

*Example XVI*

An injectable solution of the formula:

| | |
|---|---|
| 2 - methyl - 5 - 2'-(4-o-chlorophenylpiperazin - 1-yl)ethylbenzimidazole dihydrochloride | 1.0 g. |
| Distilled water | Up to 100 ml. | was prepared by dissolving the benzimidazole base in distilled water containing two equivalents of hydrochloric acid, filtering the solution and filling into ampoules. The ampoules were sterilised in an autoclave at 115° C. A 0.5% w./v. solution suitable for injection of the dihydrochloride can be prepared in a similar manner. Similar solutions can be prepared from any of the products conforming to general Formula I described in Examples I to XIV.

We claim:

1. A phenylpiperazine derivative selected from the class consisting of the compounds of the formula

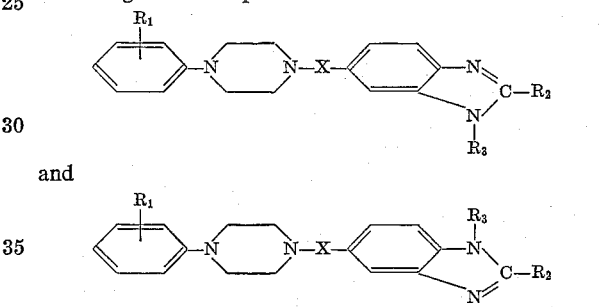

and wherein $R_1$ is selected from the class consisting of hydrogen, p-fluorine and ortho-halogen atoms, ortho-alkoxy group of 1 to 4 carbon atoms and alkyl groups in any nuclear position of 1 to 4 carbon atoms, X is selected from the class consisting of —$CH_2CH_2$— and the —$(CH_2)_3CO$— groups, $R_2$ is selected from the class consisting of hydrogen atoms and hydroxy thiol, trifluoromethyl, and benzyl groups, alkyl, hydroxyalkyl, and alkoxyalkyl groups containing 1 to 6 carbon atoms, and $R_3$ is selected from the class consisting of hydrogen atoms and benzyl groups and alkyl groups of 1 to 4 carbon atoms, and non-toxic acid addition salts of the said compounds.

2. 2-methoxymethyl-5-2'-(4-o-chlorophenylpiperazin-1-yl)ethylbenzimidazole.

3. 2-methyl-5-2'-(4-o-chlorophenylpiperazin-1-yl)ethylbenzimidazole.

4. 2-ethyl-5-2'-(4 - o-chlorophenylpiperazin-1-yl)ethylbenzimidazole.

5. 1 - ethyl-2-methyl-5-2'-(4-o-chlorophenylpiperazin-1-yl)ethylbenzimidazole.

No references cited.